United States Patent [19]

Bergman et al.

[11] Patent Number: 4,767,451

[45] Date of Patent: Aug. 30, 1988

[54] METHOD OF OPERATING AN ELECTRIC ARC FURNACE

[75] Inventors: Donald G. Bergman, Hudson, Ohio; Emil A. Elsner, Sinzheim-Vormberg, Fed. Rep. of Germany

[73] Assignee: Doncar Incorporated, Parkman, Ohio

[21] Appl. No.: 2,725

[22] Filed: Jan. 13, 1987

[51] Int. Cl.⁴ ............................ C22B 4/00; C21C 5/52
[52] U.S. Cl. ................................. 75/10.61; 75/10.46; 75/10.66
[58] Field of Search ................. 75/10.46, 10.61, 10.66; 148/23-26

[56] References Cited

U.S. PATENT DOCUMENTS 4,057,706 11/1977 Tanigaki ................................ 148/24

Primary Examiner—Peter D. Rosenberg
Attorney, Agent, or Firm—Fay, Sharpe, Beall, Fagan, Minnich & McKee

[57] ABSTRACT

In the method of producing steel by providing a vessel containing ferrous metal to be melted and passing electric current into the metal to melt the same by means of at least one electrode connected to an exterior source of electrical power, the improvement which comprises positioning an arc stabilizer material in proximity to the surface of the metal to be melted whereby as electric current is passed from the electrode into the metal the arc stabilizer material forms an arc adjuvant material which aids in the efficient operation of the electric arc, with the arc stabilizing material being an effective amount of a synthetic polymeric material having a low sulfur content.

12 Claims, No Drawings

METHOD OF OPERATING AN ELECTRIC ARC FURNACE

BACKGROUND OF THE INVENTION

The present invention relates to an improved method of operating an electric arc furnace, and in particular concerns the use of an arc stabilizer material which increases the overall operating characteristics of the concerned electric arc furnace.

The electric arc furnace is a well known and commonly employed apparatus for the production of steel. It is a compact and relatively inexpensive device. However, one problem associated with the operation of such a furnace is the cost of electric power. Accordingly, in order to reduce such cost, various techniques have been developed which are intended to replace, at least in part, the electrically generated heat with heat from other sources such as carbon, oil and natural gas. For example, special oxygen-fuel burners have been developed and installed in furnace walls as a means of providing a source of supplemental heat. However, such systems have many operational drawbacks, not to mention their high investment cost.

In addition, it is known in the art that the stability of the electric arc effects the overall efficiency of the electric arc furnace. In this regard, many attempts have been made to stabilize the arc by use of hollow electrodes or special injectors through which various gases and/or solids have been injected into the arc area.

The main purpose of attempting to stabilize the arc is to improve the overall operating parameter of the furnace. For example, in the operation of an electric arc furnace, it is desired to improve the power input rate, decrease the melt down time and use less KWh per ton of melt. Unfortunately, the techniques discussed hereinabove are either too complicated and/or expensive to be utilized significantly on a commercial basis.

Accordingly, it is the main object of the instant invention to provide an improved means of operating an electric arc furnace by utilizing an electric arc stabilizer material in proximity to the metal being melted which yields an arc adjuvant material which helps stabilize the arc so as to improve the power input rate of the furnace, decrease furnace melt down time, and require less KWh/ton of metal melted. The specific type of synthetic polymeric arc stabilizer material utilized in the practice of the invention is critical and will be described hereinafter in great detail.

While the foregoing is the principal object of the present invention, other objects and benefits will become readily apparent to those skilled in the art from a reading of the following specification and claims.

SUMMARY OF THE INVENTION

An improved method of producing steel is obtained by providing a vessel containing ferrous metal to be melted and passing electric current into the metal to melt the same by means of at least one electrode (usually three) connected to an exterior source of electrical power, wherein the improvement comprises, positioning an arc stabilizer material in proximity to the surface of the metal to be melted whereby as electric current is passed from the electrode into the metal the arc stabilizer material forms an arc adjuvant material which aids in the efficient operation of the electric arc, with the arc stabilizing material being a selected quantity of a polymeric material having a low sulfur content, usually of less than about 0.1 weight percent.

DETAILED DESCRIPTION OF THE PREFERRED PRACTICE OF THE INVENTION

The present invention relates to a new and improved method of operating an electric arc furnace. In fact, the crux of the invention resides in the use of a unique arc stabilizer material in the operation of a conventional electric arc furnace. In practice, upon the formation of an arc, this arc stabilizer material forms or generates an arc adjuvant material which helps stabilize the arc and thereby improves the overall operating characteristics of the concerned electric arc furnace.

Broadly stated, the instant invention is directed to an improved method of producing steel by providing a vessel containing ferrous metal to be melted and passing electric current into said metal to melt the same by means of at least one electrode connected to an exterior source of electrical power, wherein the improvement comprises positioning an arc stabilizer material in proximity to the metal to be melted whereby as electric current is passed from the electrode into the metal the arc stabilizer material forms an arc adjuvant material which aids in the efficient operation of the electric arc, with the arc stabilizing material being an effective quantity of a synthetic polymeric material having a low sulfur content of usually less than about 0.1 weight percent.

The synthetic polymeric material used in the preferred practice of the invention is premanufactured, that is pre-polymerized to its final molecular structure, before further processing or compounding. However, such synthetic polymeric materials can also be formed in situ from monomers and/or pre-polymers compounded into the compositions used within the scope of this invention.

The synthetic polymeric materials usable in the practice of the invention include homopolymers, mixtures of polymers, inter-polymers, and polymers compounded with non-polymeric ingredients. Some preferred examples of the above include the following: homopolymer—polyethylene, polypropylene, polystyrene, polyester, polybutylene, polycarbonate; mixture of polymers—polyethylene/polyethylene terphthalate; interpolymer—acrylonitrile/butadiene/styrene; polymer compounded with non-polymeric ingredients—polyethylene/carbon.

Although not limiting to the scope of the invention, the following materials are precursor materials which may be used in producing polymers, copolymers or interpolymers, through either addition or condensation process, which are suitable for use in the present invention: acrylonitriles, 1,3-butadiene, tert-butylethylene, diallyl phthalate, di-n-butyl, maleate, acrylonitrile/butadiene/styrenes, acetals acetylenes, acrylics, alkyds, allyl esters, allyl alcohol, amine/aldehydes, cellulosic esters, cellulosic ethers, ethers, epoxides, isoprene, maleic anhydride, methacrylic acid, furans, amides, phenol/aldehydes, amine/phenol/aldehydes, phenylene oxides, imides, butylenes, phenylenes oxides, imides, butylenes, phenylenes, carbonates, diactyl fumarate, diethyl fumarate, di-2-ethylhexyl maleate, arylate ethers, arylate esters, saturated ester, unsaturated esters, ethylenes, propylenes, pentenes, methyl pentenes, 1-hesane, 1-hesyne, indene, isobutylene, styrenes, styrene/butadienes, 2,5-dimethylstyrene, m-divinylbenzene, carboxylic acids, carboxylic anhydrides, urethanes, vinyl chlorides, vinyl alcohols, vinyl acetates, vinyl n-butyrate, vinylcyclohexene, vinyl carbonates, vinyl formates, styrene/carboxylic anhydrides, isoprnes, cyclopentadienes, succinic, glutaric, adipic, sebacic, dodecarnedioic, maleic, funaric, ethylenediamine, 1,2-propanediamine, 1,3-prepanediamine, 1,4-butanediamine, 1,6-hexanediamine, piperazine, ethylene glycol, trimethyline glycol, 1,4-butanediol, 1,6-hexanediol, 1,12-dodecanediol, propylene glycol, 1,3-butanediol, niopentyl glycol, diethylene glycol, triethylene glycol, tetraethylene glycol, dipropylene glycol, cis-1,4-cyclohexandiols, m-zylenediol, p-xylenediol, bischloroformates (CICOOROCOCI with R Group of $(CH_2)_2$, $(CH_2)_4$, trans-1,4-cyclohexyl and cis-1,4-cyclohexyl), glycolic, lactic, butyrics, valerics, caproics, salicyclic, 3-phenylacetic, 4-phenylacetic, glycolide, lactide, lactones, tolylene diisocyanate, m-xylylene diisocyanate, p-xylylene diiosocyanate, 1,2-diisocyanatoethane, hexamethylene diisocyanate, terephthalic acid, isophthalic acid, ethyl and methyl of monoestes, ethyl and methyl of diesters, trephthaloyl chloride, phthaloyl chloride, 2,6-naphthalenedicarboxylic acid, phenylenediamines, 4,4-methylenediamine, phenols, alklated phenols with R Groups up to C=12, bisphenols, A, C, and F, resorcinol, hydroquinone, 4,4-biphenol, formaldehyde, acetaldehyde, propionaldehyde, isobutyraldehyde, n-valeraldehyde, pyromellitic dianhydride, naphthalene-1,4,5,8-tetracarboxylic diahydride and diethylenetriamine.

Polymeric or interpolymeric materials useful in the practice of the present invention generally have a chemical composition of $-[CH_xO_yN_z]_n-$, where n is preferably greater than 10, and where sulfur, phosphorus and halogen content is exceptionally low or virtually nonexistent. It will be readily apparent to those skilled in the art that mixtures of the various synthetic polymeric material discussed herein can be used in the practice of the invention.

In the preferred practice of the invention, the synthetic polymeric arc stabilizer material is used in particle form, usually in the form of pellets. The exact size of the arc stabilizer material particle is not critical, except it must be sized such that when it is used it will readily form an arc adjuvent material which helps stabilize the arc during melt down. Size should not be so large as to provide any positive dielectric barrier to the normal operation of the electrodes.

The particle or pellet of arc stabilizing material can be formed in any one of a number of well known ways. For example, the pieces of polymeric material can be mixed with a suitable binder, such as molasses, and then compacted into the desired size. Since the means of forming such a particle or pellet are well known in the art and do not form a part of the instant invention, such techniques will not be discussed herein in detail.

In practice a number of tests were run to prove the efficiency of the instant invention. In this regard, in certain tests a conventional electric arc furnace was utilized with a total scrap charge of 140 tons in one or two buckets and an average power input of about 27 MW. The arc stabilizer material was a mixture of polyethylene and polyethylene.

In one series of tests, about 5 lbs. of arc stabilizer material per ton of scrap charge (700 lbs.) was placed in bags of about 25 lbs. each. The arc stabilizer material utilized had a particle size or major dimension of about ¼ inch. The bags were placed on top of the scrap in the first bucket and when the scrap was placed into the furnace the bags broke and the arc stabilizer material was well distributed over the surface of the scrap. The scrap was then melted and the operating characteristics of the furnace observed. While the heat recovery was only 50 percent, due to the fact that the furnace was relatively cold and ignition or reaction of the arc stabilizer material started late, the power input increased by about 1 MW thereby saving 7 minutes of melt down time. The commercial significance of these improved operating characteristics are readily apparent.

In another series of tests, about 4.6 lbs. of arc stabilizer material per ton of scrap charge (600-725 lbs.) was placed in bags of about 25 lbs. each. The bags were placed on top of the recharge scrap in the second bucket. As the furnace was charged, the bags broke and the arc stabilizing material was well distributed over the scrap. Because the furnace was hot, ignition or reaction of the arc stabilizing material took place on time as to generate a satisfactory amount of arc adjuvant material. In addition, oxygen was provided to the furnace. The operating characteristics of the furnace were observed and it was noted that the heat recovery was almost 100 percent and that the average power input increased by 1 MW thereby saving 10 minutes of melt down time.

The following is a table which illustrates the practice of the invention.

| Group | Heat No. | Stabilizer Bucket No. | Location | lbs/heat | KWH/ton | KWH/min | Power On Min. | Stabilizer KWH/ton[3] | Efficiency KWH/ton | % |
|---|---|---|---|---|---|---|---|---|---|---|
| Control | 14 | — | — | — | 362 | 459 | 107.6 | — | — | — |
| 1 series | 1A | 2 | top | 600[1] | 333 | 478 | 97.3 | 25.8 | 29 | 100 |
|  | 1B | 2 | top | 600 | 335 | 464 | 98.8 | 25.8 | 27 | 100 |
|  | 1C | 2 | top | 725 | 329 | 490 | 98.8 | 31.3 | 33 | 100 |
| average | 3 | 2 | top | 642 | 332 | 477 | 98.3 | 27.6 | 30 | 100 |
|  |  |  |  |  | −30 | +18 | −9.3 | — | — | — |
| 2 series | 2A | 2 | top | 950[2] | 346 | 4711 | 105.2 | 41.5 | 16 | 39 |
|  | 2B | 2 | bottom | 1050 | 357 | 473 | 101.0 | 47.1 | 5 | 11 |
|  | 2C | 2 | bottom | 1000 | 342 | 483 | 97.0 | 43.8 | 20 | 46 |
| average | 3 | 2 | bottom | 1000 | 348 | 476 | 101.1 | 44.1 | 14 | 32 |
|  |  |  |  |  | −14 | +17 | −6.5 | — | — | — |
| 3 series | 3A | 1 | top | 700[1] | 355 | 468 | 100.6 | 31.3 | 7 | 22 |
|  | 3B | 1 | top | 700 | 342 | 471 | 104.9 | 30.5 | 20 | 66 |
|  | 3C | 1 | top | 700 | 351 | 473 | 97.3 | 32.1 | 11 | 34 |
| average | 3 | 1 | top | 700 | 349 | 471 | 100.9 | 31.3 | 13 | 40 |
|  |  |  |  |  | −13 | +12 | −6.7 | — | — | — |
| 4 series | 4A | 1 + 2 | top | 500 + 700[1] | 332 | 437 | (106.2) | 53.2 | 30 | 56 |
|  | 4B | 1 + 2 | top | 500 + 600 | 326 | 484 | (99.9) | 47.4 | 36 | 76 |

-continued

SUMMARY OF USE OF ARC STABILIZER MATERIAL IN ELECTRIC ARC FURNACE

| Group | Heat No. | Stabilizer Bucket No. | Location | lbs/heat | KWH/ton | KWH/min | Power On Min. | Stabilizer KWH/ton[3] | Efficiency KWH/ton | % |
|---|---|---|---|---|---|---|---|---|---|---|
| average | 2 | 1 + 2 | top | 500 + 650 | 329 −33 | 446 −13 | (103.5) (−4.1) | 50.3 — | 33 — | 66 — |

Remarks
[1] Particle size ⅛"
[2] plastic size 2"
[3] 1 lb. stabilizer = 6 KWH

It is important in the practice of the instant invention that the arc stabilizer material be used in a manner such that it will assist generate arc adjuvant material which will help stabilize the arc during melt down. Generally, this is accomplished by distributing the arc stabilizer material over the surface of the scrap charge or liquid bath as uniformly as practical. Under these conditions, the energy recovery is usually higher than 80 percent and the arc is stabilized to such a degree that the average power input increases up to about 4 percent. To insure adequate distribution of the arc stabilizer material, it is desirable to use a properly sized material. In this regard, while material of any size can be used so long as it forms a suitable amount of arc stabilizer adjuvant to stabilize the arc, it has been found desirable to use particles having a maximum dimension no greater than about 3½ inches with optimum results being achieved when the maximum dimension of the particle is ⅛ inch and down (smaller).

In practice, the arc stabilizer material is usually employed in amounts ranging from about 2 lbs. to about 6 lbs. per ton of scrap. To date, no significant benefit has been discerned at less than 2 lbs/ton usage with maximum benefits apparently peaking out at about 6 lbs/ton.

As is shown from the data presented herein, maximum benefits are realized when the arc stabilizng material is employed in a hot furnace. Accordingly, the addition of the arc stabilizer material to the recharge bucket produces better results than when it is added to the first bucket, unless the furnace is operated with a liquid heel. In addition, when arc stabilizer material is used in a furnace containing molten metal, it is preferable to inject the stabilizer material into the crater formed by the electric arc by means of a hollow electrode or a separate injection device. In addition, it should be noted that when melting solid scrap arc stabilizer material can be injected into the furnace by similar means, i.e. a hollow electrode or a separate injection device.

It will be readily appreciated by those skilled in the art that the instant invention finds use in all types of electric arc furnaces which are designed to melt ferrous metal but that the preferred furnace of utilization is the conventional 3 phase, 3 electrode, AC electric arc furnace.

In addition, while not discussed herein in detail, it will be readily apparent that other materials, such as heat producing substances, can be concurrently used in the method of the present invention to obtain improved operation of the concerned electric arc furnace.

While there have been described herein what are at present considered to be the preferred embodiments of this invention, it will be apparent to those skilled in the art that various changes and modifications may be made therein without departing from the invention, and it is intended in the appended claims to cover all such changes and modifications as fall within the true spirit and scope of the invention.

What is claimed:

1. In the method of producing steel by providing a vessel containing ferrous metal to be melted and passing electric current into said metal to melt the same by means of at least one electrode connected to an exterior source of electrical power, the improvement which comprises:

positioning an arc stabilizer material in close proximity to said metal whereby as electric current is passed from said electrode into said metal said arc stabilizer material forms a reaction product which aids in the efficient operation of said electric arc, with said arc stabilizer material being an effective amount of a synthetic polymeric material having a low sulfur content.

2. The method of claim 1 wherein said arc stabilizer material is at least one material selected form the group consisting of polyethylene, polypropylene, polystyrene, polyester, polyamides, polycarbonate, phenolics, polyacrylonitrile, poly-1,3-butadiene, poly-m-divinylbenzene, poly-1-hexene, polyindene, polyisobutylene, polyisopene, poly-1-pentene, polyvinyl acetate, polyvinylcyclohexene, polymaleic anhydride, polymethacrylic acid, polyvinyl n-butyrate, polyvinylene carbonate, polyvinyl formate and melamines.

3. The method of claim 2 wherein said arc stabilizer material is polypropylene.

4. The method of claim 1 wherein said arc stabilizer material is in particle form.

5. The method of claim 4 wherein said particle has a major dimension no greater than 3½ inches.

6. The method of claim 5 wherein said particle has a major dimension no greater than ⅛ inch.

7. The method of claim 1 wherein said arc stabilizer material is added in an amount ranging from about 2 to 6 pounds per ton of metal to be melted.

8. The method of claim 1 wherein said arc stabilizer material is positioned on top of the metal to be melted.

9. The method of claim 1 wherein a plurality of buckets containing scrap metal are utilized and said arc stabilizer material is placed in at least said second bucket on top of the scrap metal therein.

10. The method of claim 1 wherein said arc stabilizer material is injected into said vessel containing said metal.

11. The method of claim 1 wherein said metal is molten.

12. The method of claim 1 wherein said metal is in solid form.

* * * * *